June 26, 1928.
A. J. KEMPIEN
1,675,110
CONTROLLED BALLOON AND DISPLAY RELEASE
Filed June 6, 1924   3 Sheets-Sheet 2
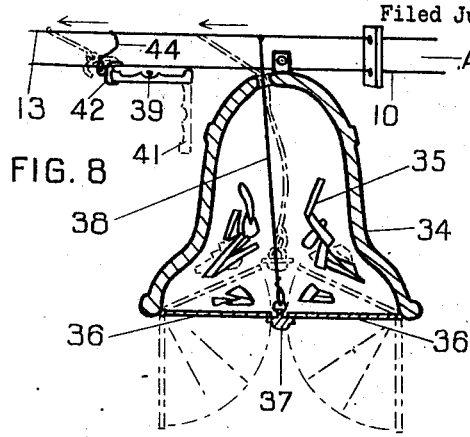
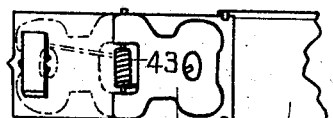
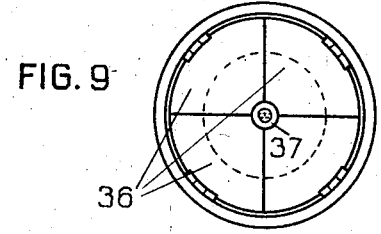
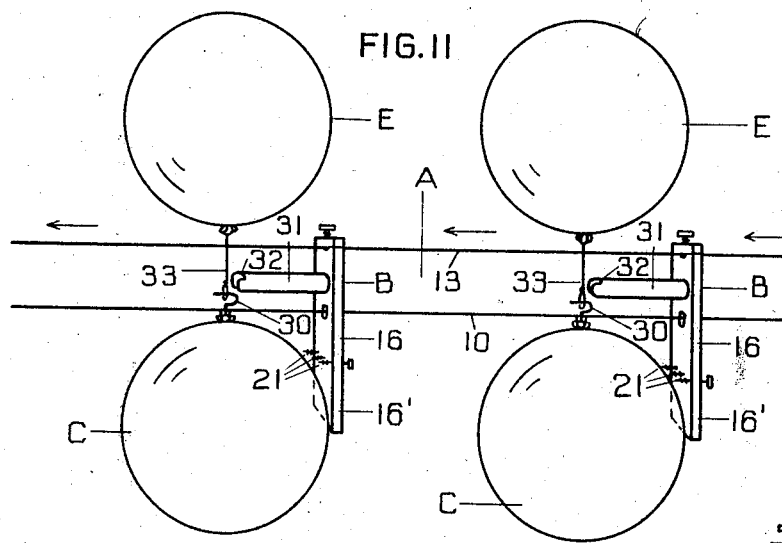
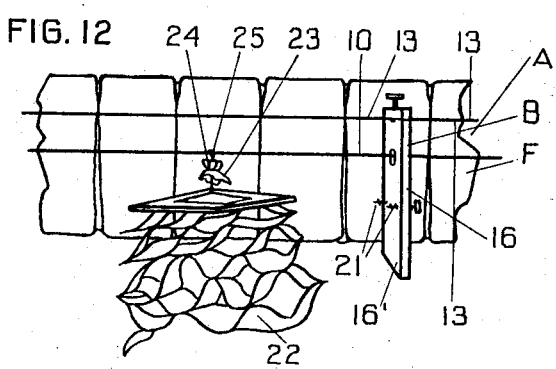
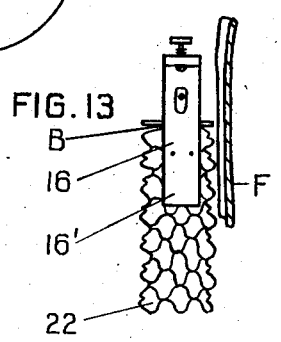
INVENTOR.
August J. Kempien
BY
ATTORNEYS.

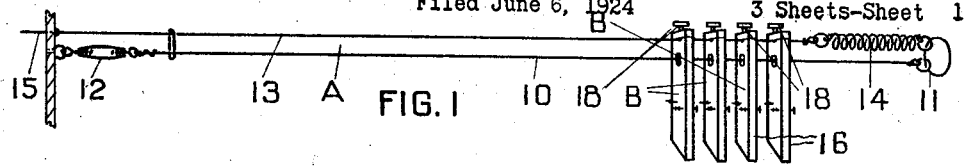
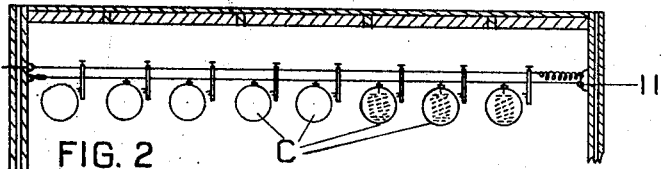
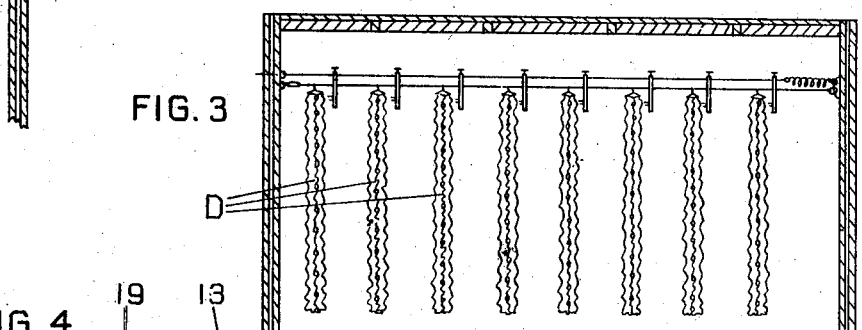
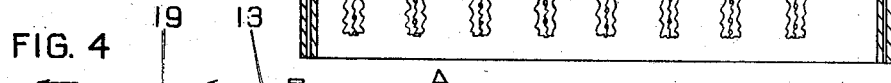
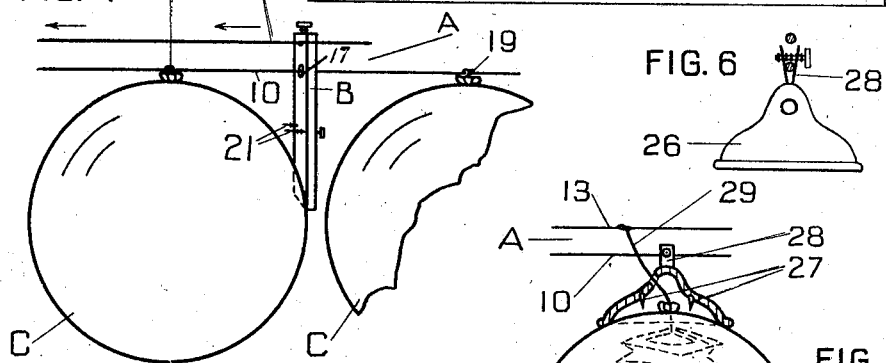
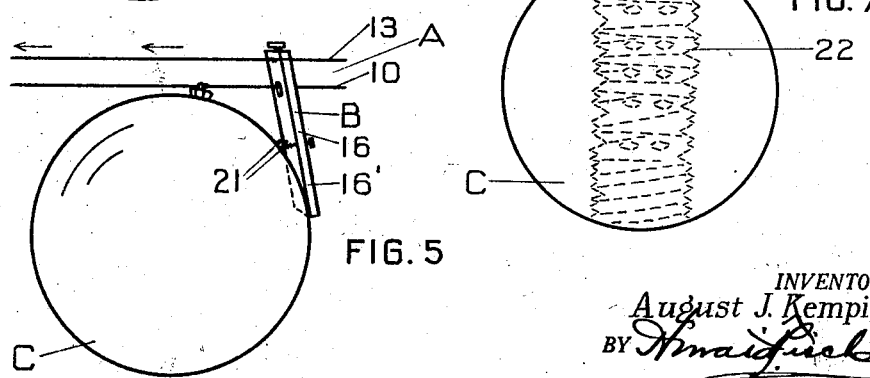

June 26, 1928.
A. J. KEMPIEN
1,675,110
CONTROLLED BALLOON AND DISPLAY RELEASE
Filed June 6, 1924     3 Sheets-Sheet 3
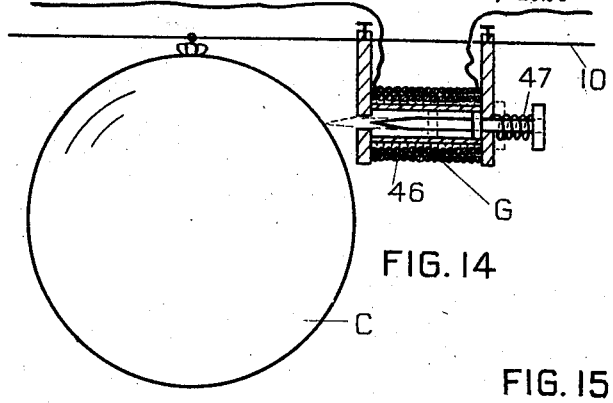
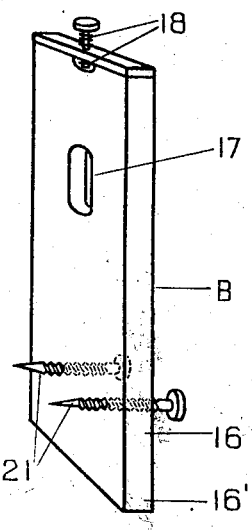
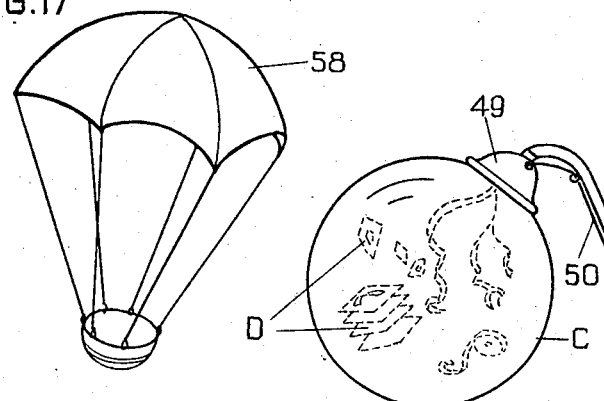
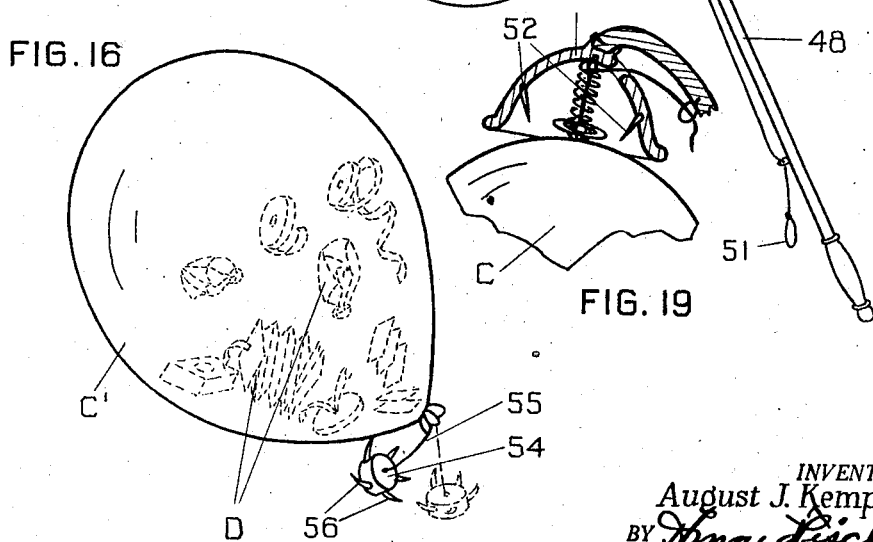
INVENTOR.
August J. Kempien
BY
ATTORNEYS.

Patented June 26, 1928.

1,675,110

UNITED STATES PATENT OFFICE.

AUGUST J. KEMPIEN, OF ST. PAUL, MINNESOTA.

CONTROLLED BALLOON AND DISPLAY RELEASE.

Application filed June 6, 1924. Serial No. 718,266.

My invention relates to a controlled balloon and display release wherein it is desirable to use an inflated balloon to form a display and by exploding the balloon the contents within the same, which was not perceived by the spectators until the balloon exploded, is brought into full view and forms either a fixed display or display means which can be floated off into the air to make a very attractive display.

A feature of the invention resides in means for exploding a series of fixed balloons so that a curtain display effect is accomplished by the decorations concealed within the balloon and which are fixed in relation to the positioning of the balloons so that when the displays are released from each balloon they will stream down into the room and form a very effective screen or display curtain of an attractive nature.

The controlled puncturing feature of my invention is quite important, because it affords means for puncturing individual or a series of balloons at the desired moment and also in a manner so that a series of balloons can be punctured one after the other. The report of the explosion of the balloons in the act of puncturing adds a feature to the invention which makes the device more effective and permits the displays within the balloon to be effectively discharged out of the same into the open atmosphere.

The invention also includes a unit construction wherein the supporting member which forms the rigid support for the balloons and display devices is held in a fixed, set position, while a pull cord or puncturing means is associated therewith and provides the controlled puncturing means and releasing means for the balloons and displays. These units can be made up so that any length display can be formed by connecting the units together or the units can be used individually for a series of balloons and displays to release the same into display position when desired. Each of the units are provided with the complete means which is associated together to accomplish the desired result.

The invention provides means for making a display by puncturing individual or a series of balloons and simultaneously releasing gas balloons so that when one balloon is exploded the gas balloon is simultaneously released to float into the upper atmosphere, providing a unique displaying effect.

The invention provides a means of display wherein display material is concealed and by means of the controlled releasing mechanism or means the concealed display material is showered out into the full displaying position; and associated with this form of display or any of the particular forms of my invention a cap exploding means can be used or associated therewith so that simultaneously with the releasing of the display the cap is exploded to increase the effectiveness of the display at the releasing movement. By suitable means the display holding unit can be screened from view so that the spectators cannot readily visualize just how and where the display material has all come from.

An important feature of the invention resides in means for puncturing a gas balloon which has been released into the open atmosphere by suitable puncturing means associated with the balloon which is forced into contact with the surface of the balloon to puncture the same and explode it into mid air and thus release parachutes and other display material out into the atmosphere, which makes a shower of display very effective.

In carrying out my invention I also provide a suitable means for supporting upon a handle member an individual balloon which is provided with puncturing and releasing mechanism so that the display material within the balloon can be showered out at the time the same is exploded and so that new balloons can be attached thereto to repeat the operation. Each of the balloon exploding means are provided with a protective feature so that the balloon cannot be accidentally exploded and to prevent anyone from being harmed by the exploding means. The controlled balloon exploding means is also effected by an electric mechanism which causes the balloons to be individually, selectively or simultaneously exploded.

In the drawings forming part of my specification,

Figure 1 is a diagrammatical view of one of my units including the holding and exploding means.

Figure 2 is a diagrammatical view of the unit of my invention applied in a room ready to explode a series of balloons.

Figure 3 illustrates the display in position to form a curtain effect, the display illustrated having been exploded out of the individual balloon and now held in fixed position on the fixed member of the unit.

Figure 4 is an enlarged detail view of a portion of my device.

Figure 5 illustrates a detail of the device in the act of puncturing a balloon.

Figure 6 illustrates a puncturing and supporting means for the individual balloons of my device.

Figure 7 is a central section of the same illustrating a balloon attached thereto, showing a portion of the unit and a display concealed within the inflated balloon.

Figure 8 illustrates a portion of the operating unit wherein a bell-shaped display holding means is illustrated in central cross section.

Figure 9 is a bottom view of the bell illustrated in Figure 8.

Figure 10 illustrates a detail of a portion of the cap exploding means.

Figure 11 illustrates a portion of my operating unit wherein gas balloons are associated with the balloons to be exploded and releasing mechanism therefore.

Figure 12 is a detail of a portion of the unit illustrating the concealing curtain for the same.

Figure 13 is a section on the line 13—13 of Figure 12.

Figure 14 illustrates the electrical means for exploding the balloon.

Figure 15 is a perspective view of one of the balloon puncturing members used in my unit.

Figure 16 illustrates one of the aerial balloons having means to be exploded in the air.

Figure 17 is a fanciful display parachute as it would appear after having been released from concealment within a balloon when the same had been exploded.

Figure 18 illustrates the individual balloon holding member of my invention.

Figure 19 is a sectional detail portion of the same.

In the drawings my controlled balloon and display release unit as A in its entirety is made up of a stationary or fixed wire member 10 which is held by a ring 11 on one end which is adapted to be attached to the wall, as illustrated in Figure 2, and the other end is drawn tight by the turn buckle 12 of ordinary construction. This holds the member 10, which may be a round wire, flat or any other suitable means, firmly in place. Associated with the member 10 and extending in close proximity thereto is the operating member or cord 13, which is held by the coil spring 14 on one end and is adapted to be pulled or otherwise operated on the free end 15.

The operating member 13 is adapted to operate the balloon puncturing members B which are held freely slidable on the member 10 and fixed to the member 13. The balloon puncturing members B are formed with a flat body portion 16, which is provided with an elongated hole 17 through which the wire member 10 freely passes, and is held rigidly and adjustably secured to the wire operating member 13 by the set screw 18 positioned in the top of the same.

In this manner the unit A is complete with a series of members B so that inflated balloons C can be attached adjacent each of the members B and the members B positioned in the desired positions in relation to each of the balloons C, so that when the operating cord 13 is pulled the balloons C will be all exploded at the same time, or successively exploded as may be desired. The balloons C are rigidly secured at 19 to the member 10.

Each of the balloon puncturing members B are provided with one or more puncturing needles 21 which are threaded into the body 16 of the same, so that the puncturing ends of the same can be projected at various distances from the body 16. This means of construction provides an adjustment to the needles 21 so that if it is desired to puncture the balloons at different intervals by the single operation of the pull cord 13, then the needles on the respective puncturing members B are set at different positions, so as to function to give the desired result.

Each of the balloons C are adapted to conceal and hold display material of any suitable nature. This may be confetti, parachutes, streamers, and in fact any attractive display such as a fixed accordian streamer 22 as illustrated in dotted outline in Figure 7 and also in Figures 12 and 13. In case the accordian display or streamer is used, as 22, the cord 23 of the same extends through the neck 24 of the balloon and is secured at 25 to the fixed member 10 of the unit A. In this manner the display 22 is fixed to the wire supporting member 10 and is held in position so as to hold the display and the balloon in position. When the balloon explodes only a small portion, or the neck of the same, is left and the display hangs free, extending into the room to form a very effective and attractive decoration. My display can be used in this manner to form a curtain of streamers D, as illustrated in Figure 3 or in any other suitable manner.

The explosion of the balloons acts most effectively in discharging the display therefrom, in a manner so that the loose display material within the same is scattered into the atmosphere, while the fixed displays are moved quickly into displaying position.

In Figures 6 and 7 I have illustrated a cup-shaped member 26 within which balloon puncturing needles 27 are concealed, and which is held by the clamp 28 to the fixed member 10 of the unit A, while the balloon and display are attached to the cord 29, which in turn is attached to the operating cord or member 13. When it is desired to explode the balloon held by this cup member, the pulling of the cord 13 draws the balloon into the cup member sufficiently to bring the wall of the same in contact with the piercing members 27 and it is exploded, while the remaining neck of the balloon is drawn up into the cup and concealed from ordinary view so that the spectators cannot see the same, and the effect of the display coming out of the balloon is much more pronounced and attractive, as the balloon practically disappears, while the display takes its place.

In the individual puncturing members B the body 16 is formed with a depending portion 16' which forms a guard which projects downward from the puncturing needles 21 in a manner so as to prevent the balloons from coming in contact with the same when it is not desired, or before the operating member 13 has been pulled.

Figure 5 illustrates the puncturing member B drawn over into the act of puncturing the balloon C, the guard end 16' bearing against the side of the same, while the member 13 is drawn in the direction of the arrows to cause the needles 21 to become effective in the balloon. The moment the surface of the balloon is punctured it explodes with a loud noise and the release of the air in the same blows the display into viewing position.

With the operation of my device shown in Figure 11 I associate gas balloons E which are held on the hook members 30, while the puncturing members B are provided with a releasing finger 31, having a notch 32 which engages the cord 33 of the balloon E and releases it from the hook 30 simultaneously with the puncturing of the lower balloon C held fixed upon the member 10 of the unit A. This display drops the concealed display material within the balloons, while the gas balloons go up into the atmosphere and the whole display is very effective. The gas balloons obviously might have concealed within them display material and may be of the puncturing type as illustrated in Figure 16, so that when they get up into the atmosphere they will explode themselves and discharge the display material, so as to increase the effectiveness of the display.

In Figures 12 and 13 I have illustrated a curtain F which extends along the unit A so as to conceal the same, the curtain F forming a part of the decoration. In this manner my invention can be used to form a very effective decoration on a stage; or two of these curtains such as F can be used one on each side of the unit A, thus concealing the same practically from view of the spectators.

A feature of the invention resides in the unit A being complete in itself, wherein the unit A with the members 10 and 13 can be connected to similar members of another similar unit on their ends so that any length display may be acquired. Obviously, these units can be such that only one spring 14 is necessary for the entire series and only one turn buckle 12 is necessary to operate the device in an effective manner. The idea of the units is to provide a practical means for supplying any length that may be required to make up a complete display.

My display mechanism as shown in Figures 8, 9 and 10 is adapted to include a receptacle such as 34 which is in the form of a bell or which can be of any suitable shape, and in which the display material, such as 35, can be held concealed from view until the controlled releasing mechanism is operated. In the device 34 the bottom of the same is formed by a series of members 36 which are hinged to the lower portion of the member and are held in closed position by the button member 37, which is positioned centrally as illustrated in Figures 8 and 9. The cord 38, which is secured to the button 37, is secured to the operating cord 13 and when the operating cord 13 is pulled, the button draws the closures 36 upward, as illustrated in dotted outline in Figure 8, and the button slips through or past the free edge of the closures, allowing them to drop as illustrated; and at this moment all of the display material within the receptacle 34 is discharged out of the same. The display material 35 therein can be attached to the cord 38 or it can be held loose and free therein. The receptacle 34 is rigidly secured to the member 10 of the unit A.

In conjunction with the operation of the receptacle 34 a cap exploding box 39, of ordinary, well-known construction, is operable and is fixed to the member 10. The cap exploding box 39 is provided with a cap hammer 40, hinged therein and held out of operation as illustrated in Figure 10, until the hinged cover 41 of the same is released by the releasing of the clip 42, which holds the cover 41 closed against the action of the spring 43, which operates the hammer 40. The clip 42 is connected by the cord 44 to the pull cord 13 and when the material within the receptacle 34 is released the cap within the box 39 is exploded, so that a report is made in a similar manner as in the exploding of the individual balloons.

The controlled balloon and display device as shown in Figure 14 may be operated by electrical coils G, which could be connected in series or otherwise, and which are provided with a balloon piercing needle 46 which is held by the coil spring 47, normally concealed within the coil G, is adapted when the current is passed through the same to be forced into position to pierce the balloon C and thus explode the same. In this manner the device is electrically operated in an effective way, so as to give the same results in the display.

My invention includes an individual balloon support and display mechanism which is provided with a handle 48 upon which the cup and guard member 49 is secured in a manner so as to hold a balloon C by the cord 50, which extends down along the handle and has an operating end 51 into which the operator can insert his finger and pull the same to draw the balloon up against the piercing needles 52, which are concealed within the cup member 49. In this construction a coil spring 53 is positioned centrally within the cup and projects out against the balloon C so as to hold the same out of engagement with the edge of the cup and the piercing points 52. However, when the cord 51 is operated, the spring 53 is compressed and the balloon is brought into contact with the piercing points 52, exploding the same and discharging the display material which was concealed within the inflated balloon out into the atmosphere.

My invention provides an aerial balloon C' which is provided with a self puncturing means 54, held in a manner to swing freely from the cord 55 at the neck of the balloon and the member 54 is provided with suitable piercing members 56 which will be freely moved over against the surface of the balloon to puncture the same when the wind blows the member 54, and also caused by the swinging of the balloon in the atmosphere. This aerial balloon is a very effective display. It will invariably be exploded after going a short distance in the air by the swinging of the puncturing member 54, and all of the concealed display contents of the same are blown out into the atmosphere and provide a display which has the appealing and attractive nature such as has been long desirable by those wishing to provide a unique display in an effective and very attractive manner. For instance, if this aerial balloon is provided with small parachutes, such as 58, or other display matter which will float through the air, then when it is exploded in mid air it can be readily apprehended how effective such a display will be and the novelty of the same is sure to be impressive, so that a most satisfactory and desirable result is secured.

The drawings illustrate peculiar and particular forms of construction, but I desire to have it understood that these are only illustrative and that obviously the invention can be carried out by other means and applied to uses other than those above set forth within the scope of the following claims.

I claim:

1. A controlled display including a member adapted to hold and conceal a series of display articles and controlled means associated with said member in a manner to release the display articles therein to form a complete display when the articles are discharged out of said member.

2. A controlled balloon and display release including means for supporting a series of inflated balloons, displays concealed within said inflated balloons and means for puncturing said balloons to discharge the concealed displays out into full view.

3. A controlled balloon puncturing device upon which a series of inflated balloons may be attached and adjustable means for automatically puncturing balloons on said supporting means successively, one after the other.

4. A display device including an inflated balloon, display material concealed within said balloon and means for puncturing said balloon to discharge display material into the outer atmosphere.

5. A controlled display release including a series of balloons having concealed therein display material and means for exploding the concealed display material into the open atmosphere.

6. A balloon controlled display device including display material concealed within a balloon and means adapted to puncture said balloon to blow by the force of the explosion of the puncturing of the balloon the display material concealed therein out into the atmosphere to form a fixed and movable display.

7. A display including inflatable balloons, means for supporting said balloons in a fixed position and means for exploding and simultaneously releasing said balloons to discharge display material out of the balloon exploded and to float the unexploded balloon into the air and means for exploding the balloon floated into the air.

8. A display including an inflated balloon, means for supporting said balloon and means for puncturing said balloon to discharge display material held concealed within said balloon out into the open atmosphere at the instant of explosion of said balloon.

9. A display including a series of inflated balloons, a series of adjustable puncturing members associated with said balloons, a guard formed on said puncturing means to prevent accidental puncturing of said balloons and means for operating said puncturing means to explode the balloons simultaneously or consecutively.

10. A display including an inflated balloon, display material concealed within said balloon, means for supporting said balloon and display material and means for exploding said balloon to expose said display at the moment of explosion of the balloon.

11. A controlled display device wherein a series of display material is concealed and means for exploding said display material into exposure.

12. A controlled ballon and display release, including a fixed supporting member adapted to support a series of inflated balloons, display means concealed within said balloons held by said support, a pull cord associated with said supporting member, balloon puncturing members slidably secured to said support and adjustably fixed to said pull cord, whereby said pull cord is adapted to operate to puncture a series of balloons consecutively or simultaneously.

13. A display device including a supporting wire, a pull cord associated with said wire, a series of block members slidably secured to said supporting wire and adjustably fixed to said pull cord, resilient means for holding said pull cord to permit the same to be pulled in a direction to operate said block members or reciprocate the same to form a unit wherein a series of displays can be secured to said supporting wire and operated by said pull cord.

14. A gas balloon having novelty matter therein for distribution, and means associated with the balloon adapted for rupturing the same to cause distribution of the matter.

15. A gas balloon having novelty matter therein for distribution, and means associated with the balloon adapted for opening the same to cause distribution of the matter.

AUGUST J. KEMPIEN.